United States Patent
Ogino (10) Patent No.: US 12,517,560 B2
(45) Date of Patent: Jan. 6, 2026

(54) INFORMATION PROCESSING APPARATUS AND CONTROL METHOD

(71) Applicant: Fsas Technologies Inc., Kawasaki (JP)

(72) Inventor: Hajime Ogino, Kawasaki (JP)

(73) Assignee: Fsas Technologies Inc., Kawasaki (JP)

( * ) Notice: Subject to any disclaimer, the term of this patent is extended or adjusted under 35 U.S.C. 154(b) by 587 days.

(21) Appl. No.: 17/980,749

(22) Filed: Nov. 4, 2022

(65) Prior Publication Data

US 2023/0168724 A1   Jun. 1, 2023

(30) Foreign Application Priority Data

Nov. 29, 2021   (JP) ................................. 2021-193234

(51) Int. Cl.
*G06F 1/20* (2006.01)
*G05B 19/4155* (2006.01)

(52) U.S. Cl.
CPC ........... *G06F 1/20* (2013.01); *G05B 19/4155* (2013.01); *G05B 2219/49216* (2013.01)

(58) Field of Classification Search
CPC .............................. G06F 1/20; G05B 19/4155
See application file for complete search history.

(56) References Cited

U.S. PATENT DOCUMENTS

| 2003/0154331 | A1* | 8/2003 | Bader | ........................ | G06F 1/22 710/12 |
|---|---|---|---|---|---|
| 2006/0281434 | A1 | 12/2006 | Takami et al. | | |
| 2012/0136502 | A1* | 5/2012 | Liu | ........................ | F04D 25/166 700/300 |
| 2013/0054047 | A1* | 2/2013 | Uhlmann | ................ | G06F 1/206 700/300 |
| 2015/0147155 | A1* | 5/2015 | Duan | ................... | F04D 25/0613 700/275 |
| 2017/0099748 | A1* | 4/2017 | Kano | .................. | H05K 7/20718 |
| 2021/0181817 | A1 | 6/2021 | Lu et al. | | |

FOREIGN PATENT DOCUMENTS

| JP | 11-015567 A | 1/1999 |
|---|---|---|
| JP | 2006-345608 A | 12/2006 |
| JP | 2014203321 A | 10/2014 |
| JP | 2018077799 A | 5/2018 |
| JP | 2019-190779 A | 10/2019 |

OTHER PUBLICATIONS

Office Action of Japanese Patent Application No. 2021-193234, dated May 7, 2025, with Machine Translation (JPOA).

* cited by examiner

*Primary Examiner* — Mark A Connolly
(74) *Attorney, Agent, or Firm* — ArentFox Schiff LLP (57) ABSTRACT

An information processing apparatus includes: a heat generator; a fan configured to cool the heat generator; a storage configured to store identification information of the fan; a coupling destination switch configured to switch a coupling destination of a signal cable to either the fan or the storage; and a fan controller configured to control the fan via the signal cable in a state where the coupling destination is switched to the fan by the coupling destination switch, and read the identification information from the storage via the signal cable in a state where the coupling destination is switched to the storage by the coupling destination switch.

8 Claims, 10 Drawing Sheets

| EXPECTED VALUE | ERROR THRESHOLD |
|---|---|
| 8000rpm | 1600rpm |

FIG. 2B

| NUMBER | ROTATIONAL SPEED | WARNING THRESHOLD |
|---|---|---|
| FAN#1 | 8000rpm | 5600rpm |
| FAN#2 | 7900rpm | 5530rpm |
| FAN#3 | 8100rpm | 5670rpm |

INFORMATION PROCESSING APPARATUS AND CONTROL METHOD

CROSS-REFERENCE TO RELATED APPLICATION

This application is based upon and claims the benefit of priority of the prior Japanese Patent Application No. 2021-193234, filed on Nov. 29, 2021, the entire contents of which are incorporated herein by reference.

FIELD

The embodiment discussed herein is related to a control technique, for example, a technique for controlling a fan.

BACKGROUND

An information processing apparatus (computer) such as a server includes components such as a central processing unit (CPU), a memory, and an auxiliary storage device. These components serve as main heat generation sources in the information processing apparatus. In order to suppress an influence of heat generation on a performance and a lifetime of the components, outside air is taken by a fan provided in a housing of the information processing apparatus to perform air cooling of the components.

Japanese Laid-open Patent Publication Nos. 11-15567, 2006-345608, and 2019-190779 are disclosed as related art.

SUMMARY

According to an aspect of the embodiments, an information processing apparatus includes: a heat generator; a fan configured to cool the heat generator; a storage configured to store identification information of the fan; a coupling destination switch configured to switch a coupling destination of a signal cable to either the fan or the storage; and a fan controller configured to control the fan via the signal cable in a state where the coupling destination is switched to the fan by the coupling destination switch, and read the identification information from the storage via the signal cable in a state where the coupling destination is switched to the storage by the coupling destination switch.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For the air cooling of the components, a baseboard management controller (BMC) in the information processing apparatus monitors a temperature of each component and changes a rotational speed of the fan in accordance with the temperature to adjust an air volume of the fan.

A fan motor driving circuit including a temperature control circuit used in a personal computer or the like is known in relation to the control of the fan in the information processing apparatus. An electronic device in which management of a power source supplied to a plurality of electronic devices is easy and a rush current is small is also known. A range hood that determines whether there is a failure during normal operation and improves availability is also known.

In the information processing apparatus, hardware may be added for each fan in order for the BMC to acquire identification information of the fan. In this case, as the number of fans mounted in the information processing apparatus increases, an amount of hardware to be mounted also increases.

Such a problem occurs not only in a case where the BMC acquires the identification information of the fan but also in a case where various control units that control the fan acquire the identification information of the fan.

According to one aspect, an object of the present disclosure is to acquire identification information of a fan mounted in an information processing apparatus with a simple configuration.

Hereinafter, the embodiment is described in detail with reference to the drawings.

Figure 1:
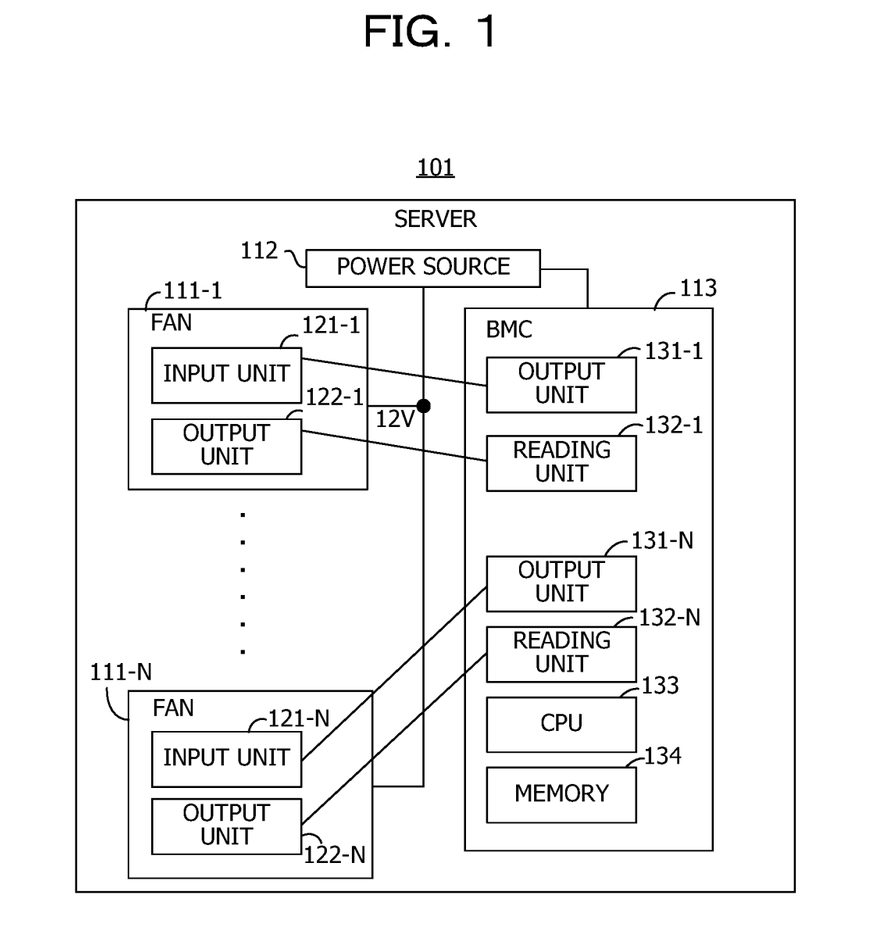
FIG. 1 is a hardware configuration diagram of a server in a comparative example.

FIG. 1 illustrates a hardware configuration diagram of a server according to a comparative example. A server 101 in FIG. 1 includes a fan 111-1 to a fan 111-N (N is an integer of 1 or more), a power source 112, and a BMC 113. Although not illustrated, the server 101 also includes heat generation components such as a CPU, a memory, and an auxiliary storage device. These constituent elements are hardware and mounted over a system board.

Each of fans 111-$i$ ($i$=1 to N) includes an input unit 121-$i$ and an output unit 122-$i$. The power source 112 supplies power to the fan 111-1 to the fan 111-N. The BMC 113 includes an output unit 131-1 to an output unit 131-N, a reading unit 132-1 to a reading unit 132-N, a CPU 133, and a memory 134.

By executing a program (firmware) by using the memory 134, the CPU 133 monitors a temperature of each heat generation component and controls an output unit 131-$i$ in accordance with the temperature. By executing the firmware, the CPU 133 also controls a reading unit 132-$i$.

According to an instruction from the CPU 133, the output unit 131-$i$ modulates a control signal by pulse width modulation (PWM). By outputting the modulated pulse-shaped control signal to the fan 111-$i$, the output unit 131-$i$ controls a rotational speed of the fan 111-$i$.

The input unit 121-$i$ of the fan 111-$i$ receives the control signal output from the output unit 131-$i$ and changes the rotational speed of the fan 111-$i$ in accordance with the received control signal. Accordingly, an air volume of the fan 111-$i$ is adjusted.

The output unit 122-*i* of the fan 111-*i* outputs a pulse signal indicating the rotational speed of the fan 111-*i* to the BMC 113. The reading unit 132-*i* of the BMC 113 receives the pulse signal output from the output unit 122-*i*, calculates the rotational speed of the fan 111-*i* from the received pulse signal, and outputs the rotational speed to the CPU 133. Accordingly, the rotational speed of the fan 111-*i* is read.

The fan 111-*i* and the power source 112 are coupled to each other via a cable, and the fan 111-*i* and the BMC 113 are also coupled to each other via a cable. As a connector on the fan 111-*i* side, for example, a 4-pin or 6-pin connector is used.

In a case of the 4-pin connector, two pins are used for coupling to the power source 112, one pin is used for coupling to the output unit 131-*i* of the BMC 113, and one pin is used for coupling to the reading unit 132-*i* of the BMC 113. In a case of the 6-pin connector, four pins are used for the same purpose as the 4-pin connector, and the remaining two pins are used as a positive terminal and a negative terminal of a light emitting diode (LED) (not illustrated) provided in the fan 111-*i*.

As a component of the server 101, a field-replaceable unit (FRU) of an industry standard specification may be used. The fan 111-*i* is also one of the FRUs. Identification information such as a serial number for identifying the FRU may be written to a nonvolatile memory mounted for each FRU. As the nonvolatile memory, for example, an electrically erasable programmable read-only memory (EEPROM) is used. In this case, as the number of FRUs increases, the number of nonvolatile memories mounted in the server 101 also increases.

In a case where the nonvolatile memory is mounted for each FRU, the BMC 113 may read the identification information of the FRU from the nonvolatile memory by inter-integrated circuit (I2C) communication. A cable including two signal lines is used for the I2C communication. Accordingly, as the number of nonvolatile memories increases, the number of signal lines for the I2C communication increases and the number of cables to be used also increases.

For example, in order to utilize an advantage of the nonvolatile memory in the high-priced server 101, the nonvolatile memory is often mounted even when the number of FRUs increases. On the other hand, in the low-priced server 101, a nonvolatile memory is not mounted in many cases in order to suppress an increase in hardware.

Next, maintenance and replacement work of the fan 111-*i* will be described. When the rotational speed of the fan 111-*i* is less than an error threshold, the BMC 113 notifies a user of a failure of the fan 111-*i* by any of the following methods.

(A1) The BMC 113 displays an error as a status of the fan 111-*i* over a management screen of a Web user interface (UI).

(A2) The BMC 113 transmits an e-mail notifying the failure of the fan 111-*i* to a terminal device of the user.

An operator of the maintenance and replacement work replaces the fan 111-*i* notified of the failure with a new fan 111-*i*, and then executes a fan test by the BMC 113. In the fan test, the BMC 113 executes the following processing.

(B1) The BMC 113 checks that the rotational speed of the fan 111-*i* reaches an expected rotational speed for each of a plurality of duty ratios while changing the duty ratios of the control signals.

(B2) The BMC 113 checks that the fan 111-*i* rotates until a maximum rotational speed is reached.

Even when the control signals having the same duty ratio are input, the rotational speeds of the fans 111-*i* are not necessarily the same because there is an individual difference in the rotational speeds of the fans 111-*i*. The rotational speed of the fan 111-*i* with respect to a specific duty ratio varies depending on characteristics unique to the fan 111-*i*.

During operation of the server 101, the BMC 113 performs warning determination by comparing the rotational speeds of each of the fans 111-*i* with a warning threshold. When the rotational speed is less than the warning threshold, the BMC 113 notifies the user of a warning.

As a continuous operation time of the fan 111-*i* increases, a lubrication performance of a motor shaft of the fan 111-*i* decreases, and the rotational speed of the fan 111-*i* decreases. For this reason, it is desirable to set the warning threshold unique to the fan 111-*i* at a timing when each fan 111-*i* is mounted in the server 101 for the first time. Accordingly, the BMC 113 executes the following processing as the setting of the fan 111-*i* in a case where the new fan 111-*i* is mounted.

(C1) The BMC 113 outputs a control signal having a predetermined duty ratio to the fan 111-*i*, reads the rotational speed of the fan 111-*i*, and determines that the fan 111-*i* has a failure when the read rotational speed is less than the error threshold. By contrast, when the read rotational speed is equal to or higher than the error threshold, the BMC 113 determines that the fan 111-*i* is normal.

(C2) The BMC 113 sets a warning threshold unique to the fan 111-*i* in accordance with the rotational speed of each fan 111-*i* determined to be normal.

Figure 2A:
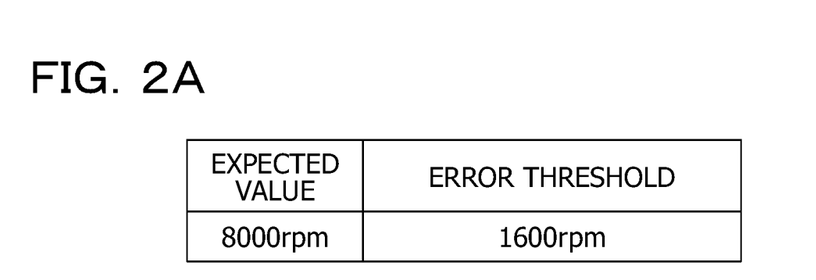
FIGS. 2A and 2B are diagrams illustrating an error threshold and a warning threshold of a fan.
Figure 2B:
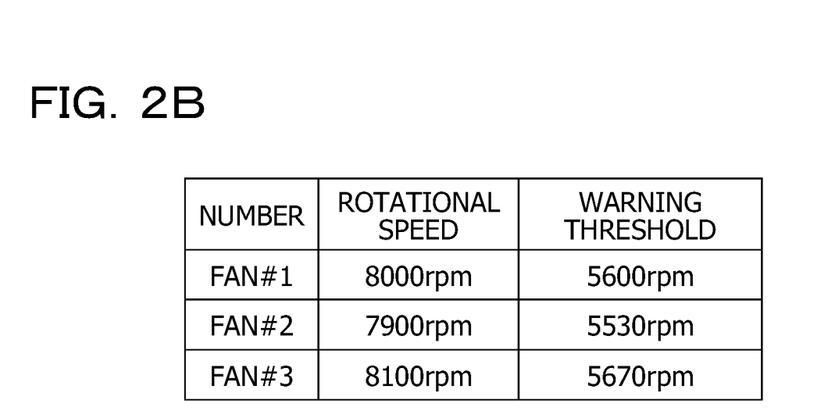

FIGS. 2A and 2B illustrate examples of the error threshold and the warning threshold of the fan 111-*i*. FIG. 2A illustrates an example of the error threshold of the fan 111-*i*. An expected value represents the rotational speed of the fan 111-*i* expected when a control signal having a predetermined duty ratio is input, and the error threshold represents an error threshold corresponding to the expected value. An rpm represents a rotational speed per minute. In this example, the error threshold is set to 20% of the expected value.

FIG. 2B illustrates an example of the warning threshold for the fan 111-*i*. A number represents a convenient number of the fan 111-*i*. FAN #i (i=1 to 3) indicates the fan 111-*i*. A rotational speed represents a rotational speed read from the fan 111-*i* when the control signal having the predetermined duty ratio is output to the fan 111-*i*, and a warning threshold represents a warning threshold corresponding to the rotational speed. In this example, the warning threshold is set to 70% of the rotational speed.

When the nonvolatile memory is mounted for each component, the BMC 113 may read identification information from the nonvolatile memory and compare the read identification information with identification information previously read and held, thereby determining whether the component has been replaced. For example, a system board, a power supply unit (PSU), or the like has a nonvolatile memory that stores the identification information.

By contrast, the fan 111-*i* does not necessarily have a nonvolatile memory. When the fan 111-*i* does not have a nonvolatile memory, it is difficult for the BMC 113 to detect the replacement of the fan 111-*i*.

In this case, after replacing the fan 111-*i* with a new fan 111-*i*, the operator of the maintenance and replacement work manually executes the fan test described above by using a terminal device coupled to the BMC 113. However, in an environment in which a large number of servers 101 are installed as in a data center, when the fan test is manually executed every time the fan 111-*i* is replaced, a load of the operator increases, and a human error may occur.

At the time of setting the fan 111-*i* after the replacement, the operator specifies the number of the replaced fan 111-*i* among the numbers of the N fans 111-$i$, and performs the setting of the fan 111-$i$ by using the terminal device. In this case, it takes time and effort to specify the number of the replaced fan 111-$i$, and there is a possibility that a human error occurs.

Figure 3:
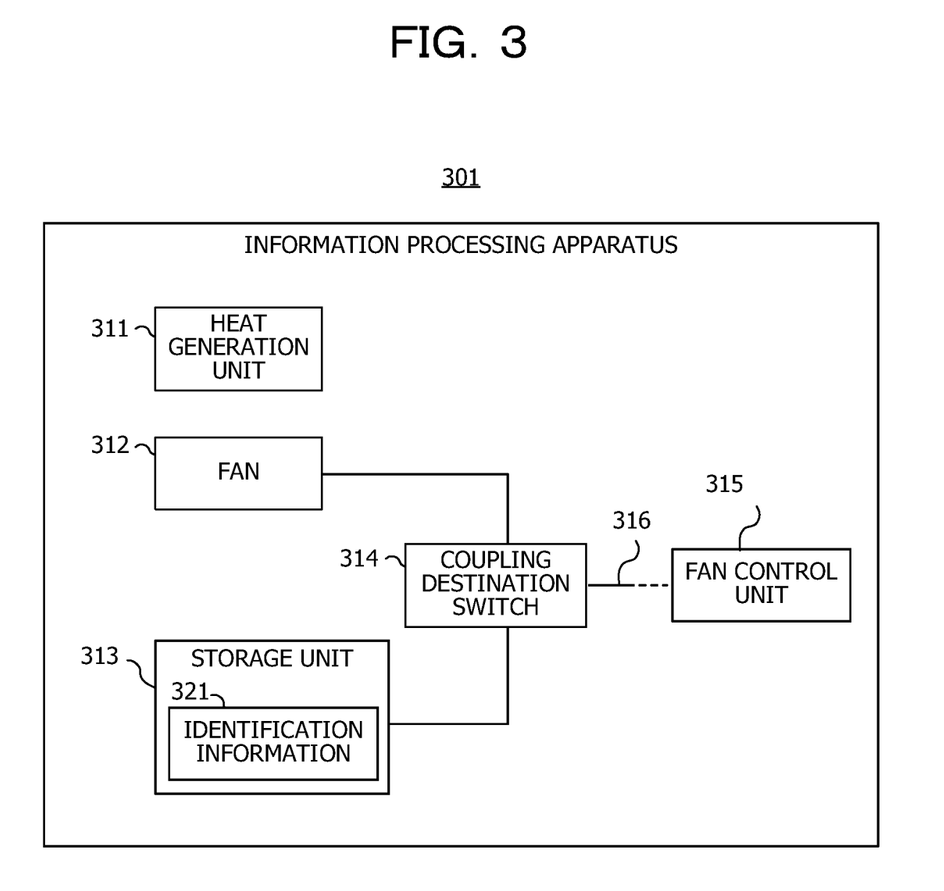
FIG. 3 is a hardware configuration diagram of an information processing apparatus according to an embodiment.

FIG. 3 illustrates a hardware configuration example of the information processing apparatus of the embodiment. An information processing apparatus 301 in FIG. 3 includes a heat generation unit 311, a fan 312, a storage unit 313, a coupling destination switch 314, and a fan control unit 315. The fan 312 cools the heat generation unit 311, and the storage unit 313 stores identification information 321 of the fan 312. The coupling destination switch 314 switches a coupling destination of a signal cable 316 to either the fan 312 or the storage unit 313.

Figure 4:
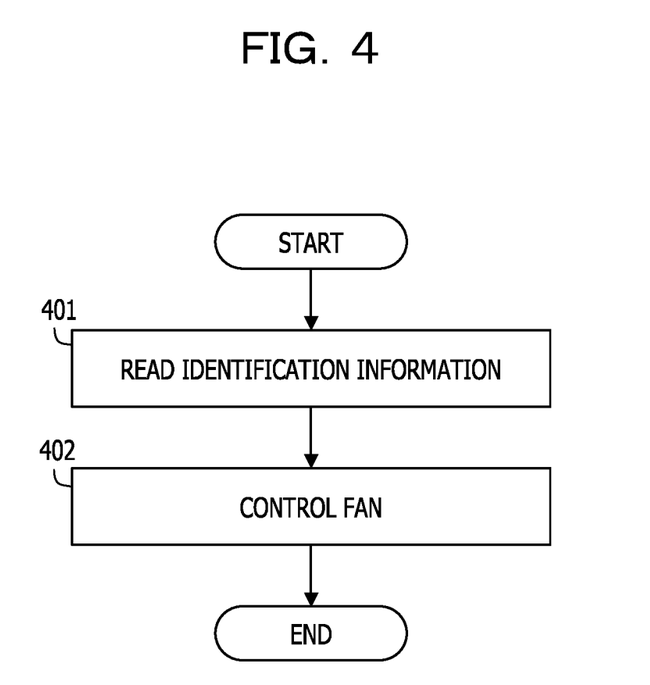
FIG. 4 is a flowchart of control processing.

FIG. 4 is a flowchart illustrating an example of control processing carried out by the information processing apparatus 301 in FIG. 3. In a state where the coupling destination of the signal cable 316 is switched to the storage unit 313 by the coupling destination switch 314, the fan control unit 315 reads the identification information 321 from the storage unit 313 via the signal cable 316 (step 401).

In a state where the coupling destination of the signal cable 316 is switched to the fan 312 by the coupling destination switch 314, the fan control unit 315 controls the fan 312 via the signal cable 316 (step 402).

According to the information processing apparatus 301 in FIG. 3, it is possible to acquire the identification information 321 of the fan 312 mounted in the information processing apparatus 301 with a simple configuration.

Figure 5:
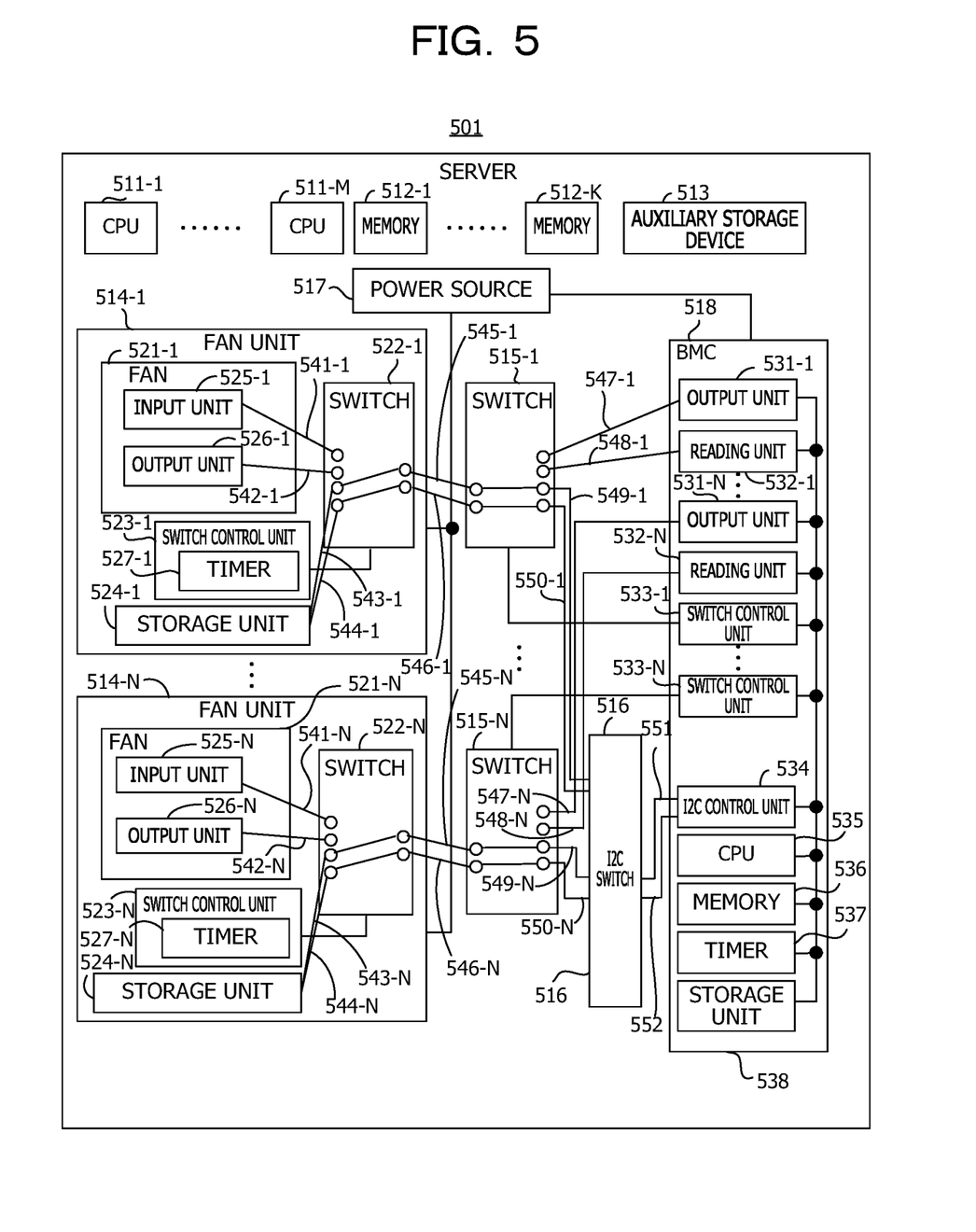
FIG. 5 is a hardware configuration diagram of a server according to an embodiment.

FIG. 5 illustrates a hardware configuration example of the server according to the embodiment. A server 501 in FIG. 5 includes a CPU 511-1 to a CPU 511-M (M is an integer of 1 or more), a memory 512-1 to a memory 512-K (K is an integer of 1 or more), and an auxiliary storage device 513. The server 501 further includes a fan unit 514-1 to a fan unit 514-N (N is an integer of 1 or more), a switch 515-1 to a switch 515-N, an I2C switch 516, a power source 517, and a BMC 518. These constituent elements are hardware and mounted over a system board.

Each of CPUs 511-$j$ ($j$=1 to M) executes a program by using each of memories 512-$k$ ($k$=1 to K) to perform information processing. For example, the memory 512-$k$ is a semiconductor memory such as a random-access memory (RAM), and the auxiliary storage device 513 is a hard disk drive (HDD), a solid-state drive (SSD), or the like. The power source 517 supplies power to the fan unit 514-1 to the fan unit 514-N.

Each of fan units 514-$i$ ($i$=1 to N) includes a fan 521-$i$, a switch 522-$i$, a switch control unit 523-$i$, and a storage unit 524-$i$. The fan 521-$i$ includes an input unit 525-$i$ and an output unit 526-$i$, and the switch control unit 523-$i$ includes a timer 527-$i$. The fan 521-$i$, the switch 522-$i$, the switch control unit 523-$i$, the storage unit 524-$i$, and the timer 527-$i$ are hardware.

Each fan 521-$i$ is used to cool a part of constituent elements among the CPU 511-1 to the CPU 511-M, the memory 512-1 to the memory 512-K, and the auxiliary storage device 513.

The BMC 518 includes an output unit 531-1 to an output unit 531-N, a reading unit 532-1 to a reading unit 532-N, a switch control unit 533-1 to a switch control unit 533-N, an I2C control unit 534, a CPU 535, a memory 536, a timer 537, and a storage unit 538. An output unit 531-$i$, a reading unit 532-$i$, a switch control unit 533-$i$, the I2C control unit 534, the CPU 535, the memory 536, the timer 537, and the storage unit 538 are hardware.

The memory 536 is a semiconductor memory such as a RAM, and the storage unit 524-$i$ and the storage unit 538 are nonvolatile memories such as an EEPROM. The storage unit 524-$i$ and the storage unit 538 may be a flash memory. The storage unit 524-$i$ stores identification information of the fan 521-$i$. The identification information of the fan 521-$i$ is written to the storage unit 524-$i$ at the time of assembly of the fan unit 514-$i$ in a factory, for example.

The server 501 corresponds to the information processing apparatus 301 in FIG. 3, and the CPU 511-$j$, the memory 512-$k$, and the auxiliary storage device 513 correspond to the heat generation unit 311 in FIG. 3. The fan 521-$i$, the storage unit 524-$i$, the switch 522-$i$, and the BMC 518 correspond to the fan 312, the storage unit 313, the coupling destination switch 314, and the fan control unit 315 in FIG. 3, respectively.

The reading unit 532-$i$ is an example of a first reading unit, and the I2C control unit 534 is an example of a second reading unit. A switch 515-$i$ is an example of a coupling source switch, and the switch control unit 523-$i$ is an example of a coupling destination switch control unit. The CPU 535 is an example of a processor.

The input unit 525-$i$ and the switch 522-$i$ included in the fan 521-$i$ of the fan unit 514-$i$ are coupled to each other by a signal line 541-$i$, and the output unit 526-$i$ and the switch 522-$i$ are coupled to each other by a signal line 542-$i$. The storage unit 524-$i$ and the switch 522-$i$ of the fan unit 514-$i$ are coupled to each other by a signal line 543-$i$ and a signal line 544-$i$.

The switch 522-$i$ and the switch 515-$i$ are coupled to each other by a signal line 545-$i$ and a signal line 546-$i$. The signal line 545-$i$ and the signal line 546-$i$ correspond to the signal cable 316 in FIG. 3.

The switch 515-$i$ and the output unit 531-$i$ of the BMC 518 are coupled to each other by a signal line 547-$i$, and the switch 515-$i$ and the reading unit 532-$i$ are coupled to each other by a signal line 548-$i$. The switch 515-$i$ and the I2C switch 516 are coupled to each other by a signal line 549-$i$ and a signal line 550-$i$. The signal line 549-$i$ and the signal line 550-$i$ are an example of a bus through which the identification information of the fan 521-$i$ is read.

The I2C switch 516 and the I2C control unit 534 are coupled to each other by a signal line 551 and a signal line 552.

The switch 522-$i$ switches a coupling destination of the signal line 545-$i$ to either the signal line 541-$i$ or the signal line 543-$i$, and switches a coupling destination of the signal line 546-$i$ to either the signal line 542-$i$ or the signal line 544-$i$.

When power is supplied from the power source 517, the switch control unit 523-$i$ controls the switch 522-$i$ and activates the timer 527-$i$ such that the coupling destination of the signal line 545-$i$ is switched to the signal line 543-$i$ and the coupling destination of the signal line 546-$i$ is switched to the signal line 544-$i$. The timer 527-$i$ counts a predetermined time. As the predetermined time, for example, a time sufficiently longer than a time taken for the BMC 518 to read the identification information of each fan 521-$i$ from the storage unit 524-1 to the storage unit 524-N is set. The predetermined time may be several seconds.

The switch 515-$i$ switches a coupling source of the signal line 545-$i$ to either the signal line 547-$i$ or the signal line 549-$i$, and switches a coupling source of the signal line 546-$i$ to either the signal line 548-$i$ or the signal line 550-$i$.

According to an instruction from the CPU 535, the I2C control unit 534 controls the I2C switch 516 via the signal line 551 and the signal line 552. According to an instruction from the I2C control unit 534, the I2C switch 516 switches a coupling destination of the signal line 551 to any of a signal line 549-1 to a signal line 549-N and switches a coupling destination of the signal line 552 to any of a signal line 550-1 to a signal line 550-N.

By executing the firmware by using the memory 536, the CPU 535 of the BMC 518 monitors the temperatures of the CPU 511-$j$, the memory 512-$k$, and the auxiliary storage device 513, and controls the output unit 531-$i$ in accordance with the temperatures. By executing the firmware, the CPU 535 also controls the reading unit 532-$i$, the switch control unit 533-$i$, the I2C control unit 534, and the timer 537.

For example, the BMC 518 reads the identification information of the fan 521-$i$ from the storage unit 524-$i$ during a period from when power is supplied from the power source 517 to the fan unit 514-$i$ until a predetermined time elapses.

At this time, in accordance with the instruction from the CPU 535, the switch control unit 533-$i$ controls the switch 515-$i$ such that the coupling source of the signal line 545-$i$ is switched to the signal line 549-$i$ and the coupling source of the signal line 546-$i$ is switched to the signal line 550-$i$. According to the instruction from the CPU 535, the I2C control unit 534 controls the I2C switch 516 such that the coupling destination of the signal line 551 is switched to the signal line 549-$i$ and the coupling destination of the signal line 552 is switched to the signal line 550-$i$.

Accordingly, the signal line 543-$i$ is coupled to the I2C control unit 534 via the switch 522-$i$, the signal line 545-$i$, the switch 515-$i$, the signal line 549-$i$, the I2C switch 516, and the signal line 551. The signal line 544-$i$ is coupled to the I2C control unit 534 via the switch 522-$i$, the signal line 546-$i$, the switch 515-$i$, the signal line 550-$i$, the I2C switch 516, and the signal line 552.

According to the instruction from the CPU 535, the I2C control unit 534 reads the identification information of the fan 521-$i$ from the storage unit 524-$i$ via the switch 522-$i$, the switch 515-$i$, and the I2C switch 516, and outputs the read identification information to the CPU 535. The CPU 535 stores the identification information output from the I2C control unit 534 in the storage unit 538.

After the identification information of the fan 521-$i$ is read, the CPU 535 activates the timer 537, and the timer 537 counts the same predetermined time as the timer 527-$i$.

Figure 6:
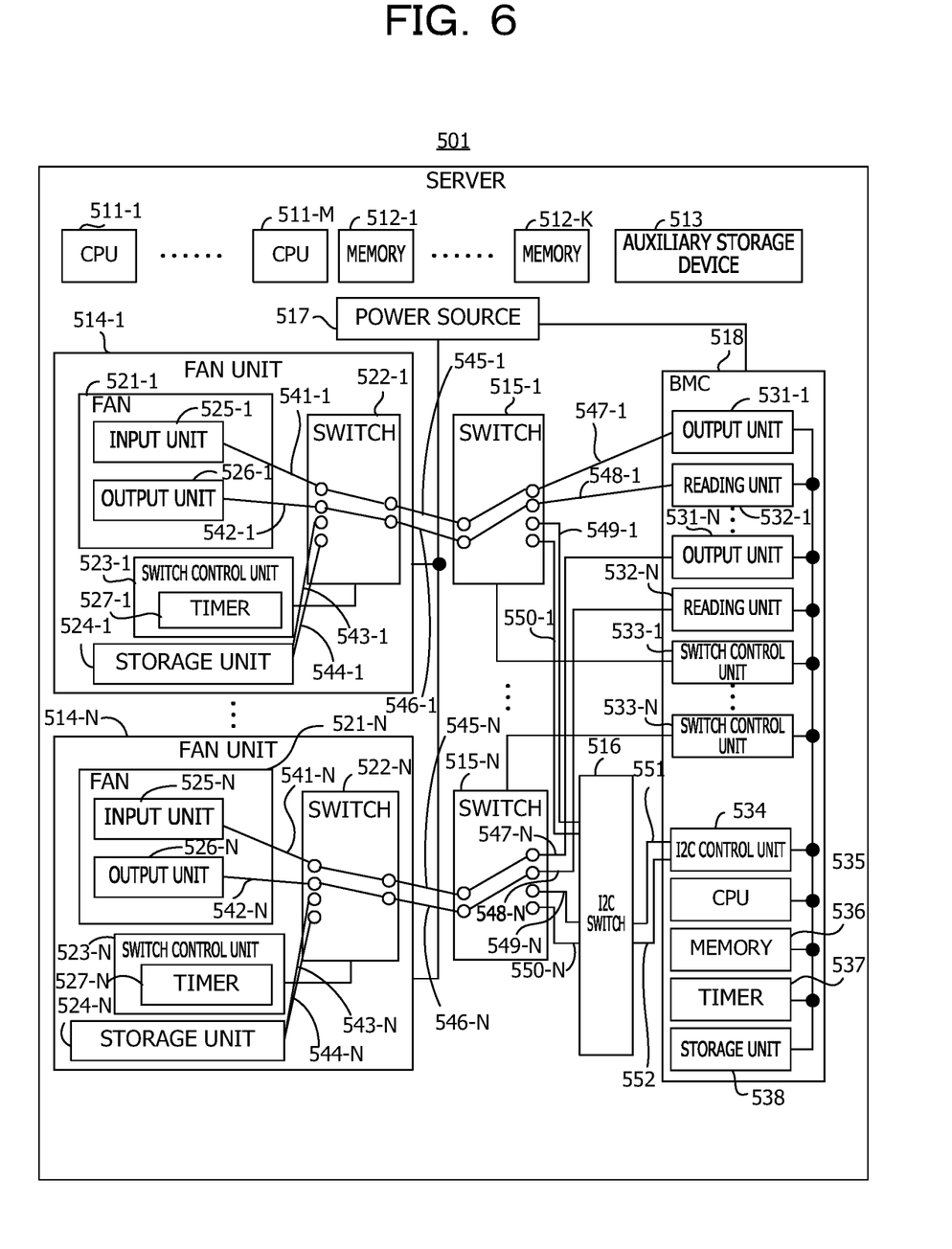
FIG. 6 is a diagram illustrating a coupling of signal lines when controlling a fan.

FIG. 6 illustrates an example of coupling of signal lines in a case where the BMC 518 in FIG. 5 controls the fan 521-1 to the fan 521-N. For control of the fan 521-$i$, the BMC 518 controls the rotational speed of the fan 521-$i$ and reads the rotational speed of the fan 521-$i$.

After the predetermined time counted by the timer 527-$i$ elapses, the switch control unit 523-$i$ of the fan unit 514-$i$ changes the coupling destinations of the signal line 545-$i$ and the signal line 546-$i$. At this time, the switch control unit 523-$i$ controls the switch 522-$i$ such that the coupling destination of the signal line 545-$i$ is switched to the signal line 541-$i$ and the coupling destination of the signal line 546-$i$ is switched to the signal line 542-$i$.

After the predetermined time counted by the timer 537 elapses, the CPU 535 of the BMC 518 changes the coupling sources of the signal line 545-$i$ and the signal line 546-$i$. At this time, in accordance with the instruction from the CPU 535, the switch control unit 533-$i$ controls the switch 515-$i$ such that the coupling source of the signal line 545-$i$ is switched to the signal line 547-$i$ and the coupling source of the signal line 546-$i$ is switched to the signal line 548-$i$.

Accordingly, the input unit 525-$i$ is coupled to the output unit 531-$i$ via the signal line 541-$i$, the switch 522-$i$, the signal line 545-$i$, the switch 515-$i$, and the signal line 547-$i$. The output unit 526-$i$ is coupled to the reading unit 532-$i$ via the signal line 542-$i$, the switch 522-$i$, the signal line 546-$i$, the switch 515-$i$, and the signal line 548-$i$.

By performing the switching of the switch 522-$i$ and the switch 515-$i$ at a time point when the predetermined time is counted by the timer 527-$i$ and the timer 537, the server 501 may be automatically shifted to a state where the fan 521-$i$ may be controlled.

According to the instruction from the CPU 535, the output unit 531-$i$ modulates the control signal by the pulse width modulation. By outputting the modulated pulse-shaped control signal to the input unit 525-$i$, the output unit 531-$i$ controls the rotational speed of the fan 521-$i$.

The input unit 525-$i$ receives the control signal output from the output unit 531-$i$, and changes the rotational speed of the fan 521-$i$ in accordance with the received control signal. Accordingly, an air volume of the fan 521-$i$ is adjusted.

The output unit 526-$i$ outputs a pulse signal indicating the rotational speed of the fan 521-$i$ to the reading unit 532-$i$. The reading unit 532-$i$ receives the pulse signal output from the output unit 526-$i$, calculates the rotational speed of the fan 521-$i$ from the received pulse signal, and outputs the rotational speed to the CPU 535. Accordingly, the rotational speed of the fan 521-$i$ is read.

By reading the rotational speed of the fan 521-$i$, the BMC 518 may check whether the rotational speed is less than the error threshold or the warning threshold. The BMC 518 notifies the user of a warning when the rotational speed is less than the warning threshold, and notifies the user of a failure of the fan 521-$i$ when the rotational speed is less than the error threshold.

According to the server 501 in FIGS. 5 and 6, by providing the storage unit 524-$i$ in the fan unit 514-$i$, the BMC 518 may read the identification information of the fan 521-$i$ from the storage unit 524-$i$. By comparing the read identification information with the identification information previously read, which is stored in the storage unit 538, the BMC 518 may determine whether the fan unit 514-$i$ has been replaced.

By providing the switch 522-$i$ and the switch 515-$i$, the signal line 545-$i$ and the signal line 546-$i$ may be used for both the control of the fan 521-$i$ and the reading of the identification information of the fan 521-$i$. Accordingly, the BMC 518 may acquire the identification information of the fan 521-$i$ with a simple configuration without increasing the number of signal lines coupled to the fan unit 514-$i$.

Further, since the BMC 518 may detect the replacement of the fan unit 514-$i$, the BMC 518 may automatically execute the fan test and the setting of the replaced fan 521-$i$. Accordingly, a burden on the operator is reduced, and an occurrence of a human error is suppressed.

Figure 7:
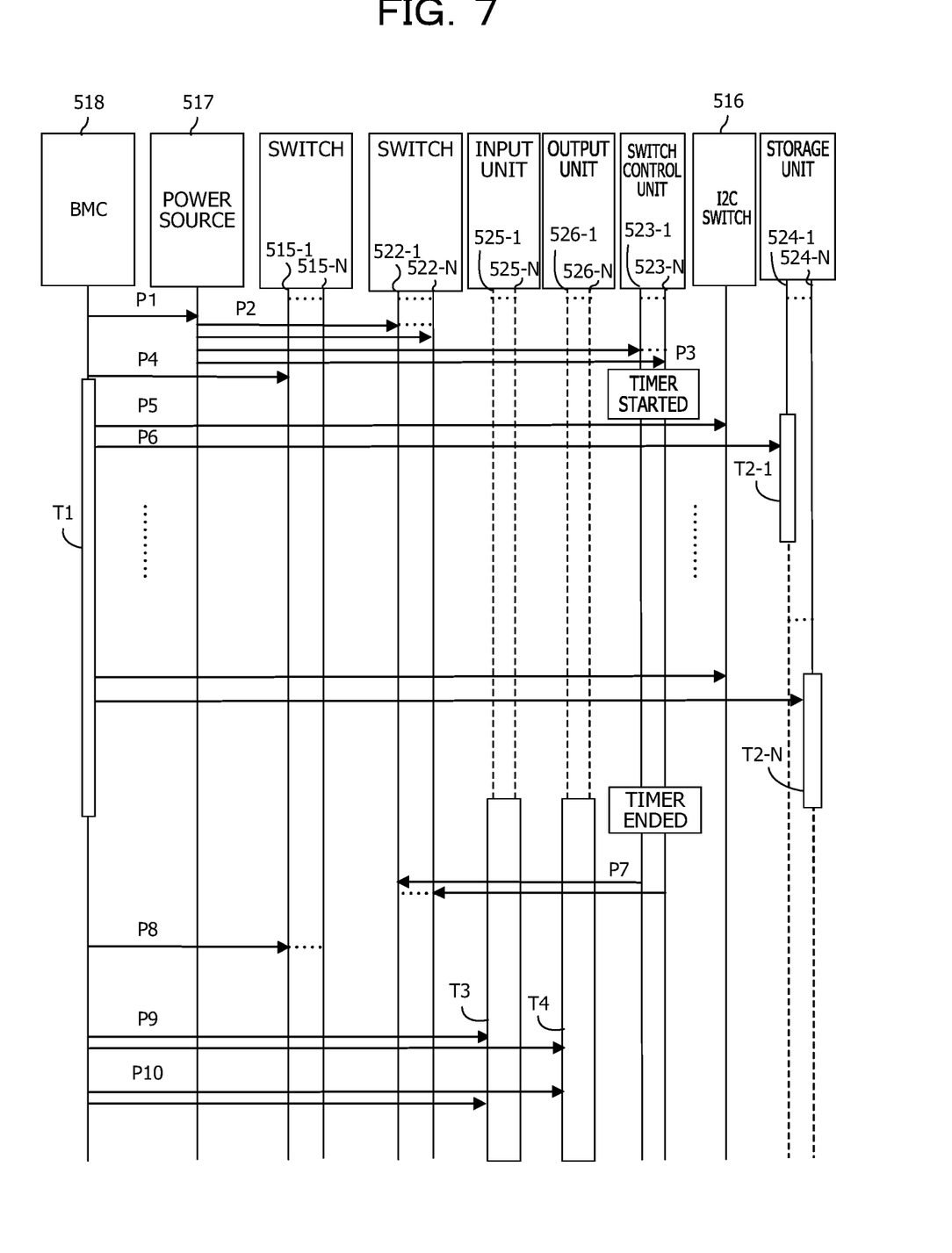
FIG. 7 is a diagram illustrating a first operation sequence.

FIG. 7 illustrates an example of a first operation sequence in the server 501 in FIG. 5. For convenience, the switch 515-1 to the switch 515-N are represented by a single rectangle in FIG. 7. The same applies to the switch 522-1 to the switch 522-N, the input unit 525-1 to the input unit 525-N, the output unit 526-1 to the output unit 526-N, the switch control unit 523-1 to the switch control unit 523-N, and the storage unit 524-1 to the storage unit 524-N.

A period T1 represents a period during which the I2C control unit 534 of the BMC 518 is able to access the storage unit 524-$i$ of any of the fan units 514-$i$ (i=1 to N). A period T2-$i$ represents a period during which the identification information of the fan 521-$i$ is readable from the storage unit 524-$i$.

A period T3 represents a period during which the input unit 525-*i* of each fan unit 514-*i* is capable of receiving a control signal. A period T4 represents a period during which the output unit 526-*i* of each fan unit 514-*i* is capable of outputting a pulse signal.

In the operation sequence of FIG. 7, the identification information of the fan 521-*i* is read and the fan 521-*i* is controlled by the following procedure.

(P1) By turning on the power source 517, the CPU 535 of the BMC 518 instructs the power source 517 to start supply of power.

(P2) The power source 517 supplies power to the fan unit 514-1 to the fan unit 514-N. Accordingly, the power is supplied to the switch 522-1 to the switch 522-N and the switch control unit 523-1 to the switch control unit 523-N.

(P3) The switch control unit 523-*i* of each fan unit 514-*i* controls the switch 522-*i* such that the coupling destination of the signal line 545-*i* is switched to the signal line 543-*i* and the coupling destination of the signal line 546-*i* is switched to the signal line 544-*i*. Each switch control unit 523-*i* activates the timer 527-*i*, and the timer 527-*i* starts counting for a predetermined time.

(P4) Each switch control unit 533-*i* of the BMC 518 controls the switch 515-*i* such that the coupling source of the signal line 545-*i* is switched to the signal line 549-*i* and the coupling source of the signal line 546-*i* is switched to the signal line 550-*i*.

(P5) The I2C control unit 534 controls the I2C switch 516 such that the coupling destination of the signal line 551 is switched to the signal line 549-1 and the coupling destination of the signal line 552 is switched to the signal line 550-1.

(P6) The I2C control unit 534 reads the identification information of the fan 521-1 from the storage unit 524-1 of the fan unit 514-1, and outputs the read identification information to the CPU 535. The CPU 535 stores the identification information output from the I2C control unit 534 in the storage unit 538.

For the fan unit 514-2 to the fan unit 514-N, the I2C control unit 534 repeats the same processing as the procedure (P5) and the procedure (P6). Accordingly, the identification information of the fan 521-*i* is read from the storage unit 524-*i* of each of the fan units 514-*i* (i=2 to N), and is stored in the storage unit 538.

After pieces of identification information of the fan 521-1 to the fan 521-N are read, the CPU 535 activates the timer 537, and the timer 537 starts counting for a predetermined time.

(P7) When the timer 527-*i* of each fan unit 514-*i* ends counting for the predetermined time, each switch control unit 523-*i* changes the coupling destinations of the signal line 545-*i* and the signal line 546-*i*. At this time, each switch control unit 523-*i* controls the switch 522-*i* such that the coupling destination of the signal line 545-*i* is switched to the signal line 541-*i* and the coupling destination of the signal line 546-*i* is switched to the signal line 542-*i*.

(P8) When the timer 537 of the BMC 518 ends counting for the predetermined time, the CPU 535 changes the coupling sources of the signal line 545-*i* and the signal line 546-*i*. At this time, each switch control unit 533-*i* controls the switch 515-*i* such that the coupling source of the signal line 545-*i* is switched to the signal line 547-*i* and the coupling source of the signal line 546-*i* is switched to the signal line 548-*i*.

(P9) The CPU 535 compares the identification information of the fan 521-*i* read from each storage unit 524-*i* in the procedure (P6) with the identification information of the fan 521-*i* previously read, which is stored in the storage unit 538. When the identification information of the fan 521-*i* read in the procedure (P6) is the same as the identification information of the fan 521-*i* previously read, the CPU 535 determines that the fan unit 514-*i* has not been replaced.

By contrast, in a case where the identification information of the fan 521-*i* read in the procedure (P6) is different from the identification information of the fan 521-*i* previously read, the CPU 535 determines that the fan unit 514-*i* has been replaced. By executing a test program, the CPU 535 performs a fan test of the fan 521-*i* and setting of the fan 521-*i*.

For example, the CPU 535 executes the same processing as (B1) and (B2) described above in the fan test of the fan 521-*i*, and executes the same processing as (C1) and (C2) described above in the setting of the fan 521-*i*.

(P10) After that, the CPU 535 monitors the temperatures of the CPU 511-*j*, the memory 512-*k*, and the auxiliary storage device 513, and controls the fan 521-*i*. For control of the fan 521-*i*, the CPU 535 periodically controls each output unit 531-*i* in accordance with the temperature, and the output unit 531-*i* outputs a control signal to the input unit 525-*i* of the fan unit 514-*i*. By receiving the pulse signal output from the output unit 526-*i*, the reading unit 532-*i* reads the rotational speed of the fan 521-*i*.

Figure 8:
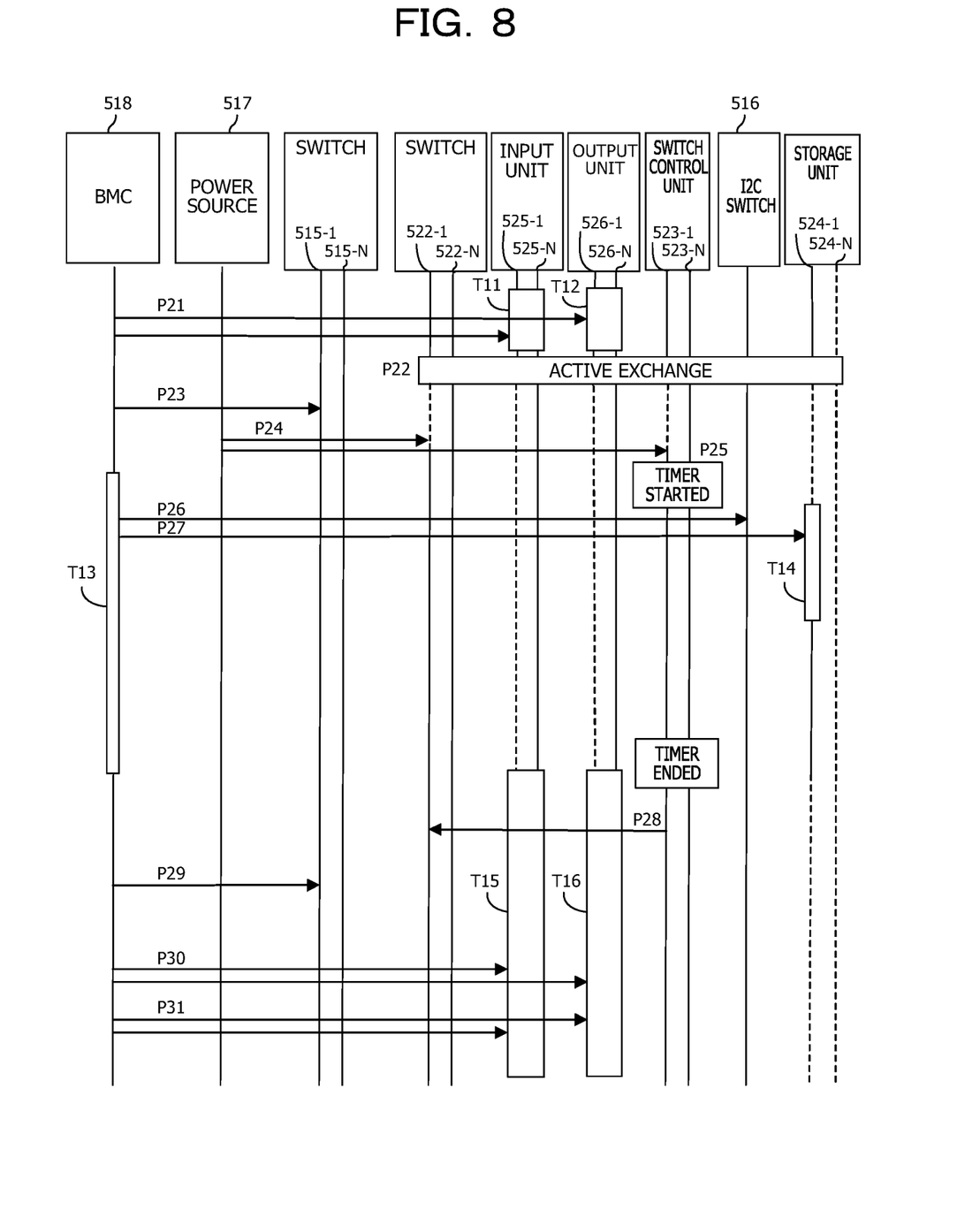
FIG. 8 is a diagram illustrating a second operation sequence.

FIG. 8 illustrates an example of a second operation sequence in the server 501 in FIG. 5. The operation sequence in FIG. 8 illustrates a procedure in a case where active exchange of the fan unit 514-1 is performed during operation of the server 501.

Periods T11 and T15 represent periods during which the input unit 525-*i* of each fan unit 514-*i* is capable of receiving a control signal. Periods T12 and T16 represent periods during which the output unit 526-*i* of each fan unit 514-*i* is capable of outputting a pulse signal.

A period T13 represents a period during which the I2C control unit 534 of the BMC 518 is able to access the storage unit 524-*i* of any of the fan units 514-*i* (i=1 to N). A period T14 represents a period during which the identification information of the fan 521-1 may be read from the storage unit 524-1.

According to the operation sequence in FIG. 8, the reading of the identification information of the fan 521-1 and the control of the fan 521-*i* are performed in the following procedure.

(P21) The CPU 535 monitors the temperatures of the CPU 511-*j*, the memory 512-*k*, and the auxiliary storage device 513, and controls the fan 521-*i*.

(P22) The operator of the maintenance and replacement work performs active exchange in which the fan unit 514-1 is replaced with a new fan unit 514-1.

(P23) The reading unit 532-1 of the BMC 518 detects that the pulse signal from the output unit 526-1 is interrupted. Accordingly, the switch control unit 533-1 controls the switch 515-1 such that a coupling source of a signal line 545-1 is switched to the signal line 549-1 and a coupling source of the signal line 546-1 is switched to the signal line 550-1.

(P24) When a new fan unit 514-1 is mounted in the server 501, the power source 517 supplies power to the fan unit 514-1. Accordingly, the power is supplied to the switch 522-1 and the switch control unit 523-1.

(P25) The switch control unit 523-1 controls the switch 522-1 such that a coupling destination of the signal line 545-1 is switched to a signal line 543-1 and a coupling destination of the signal line 546-1 is switched to a signal line 544-1. The switch control unit 523-1 activates the timer 527-1, and the timer 527-1 starts counting for a predetermined time.

(P26) The I2C control unit 534 controls the I2C switch 516 such that the coupling destination of the signal line 551 is switched to the signal line 549-1 and the coupling destination of the signal line 552 is switched to the signal line 550-1.

(P27) The I2C control unit 534 reads the identification information of the fan 521-1 from the storage unit 524-1 of the fan unit 514-1, and outputs the read identification information to the CPU 535. The CPU 535 stores the identification information output from the I2C control unit 534 in the storage unit 538.

After the identification information of the fan 521-1 is read, the CPU 535 activates the timer 537, and the timer 537 starts counting for a predetermined time.

(P28) When the timer 527-1 of the fan unit 514-1 ends counting for the predetermined time, the switch control unit 523-1 changes the coupling destinations of the signal line 545-1 and the signal line 546-1. At this time, the switch control unit 523-1 controls the switch 522-1 such that the coupling destination of the signal line 545-1 is switched to the signal line 541-1 and the coupling destination of the signal line 546-1 is switched to the signal line 542-1.

(P29) When the timer 537 of the BMC 518 ends counting for the predetermined time, the CPU 535 changes the coupling sources of the signal line 545-1 and the signal line 546-1. At this time, the switch control unit 533-1 controls the switch 515-1 such that the coupling source of the signal line 545-1 is switched to the signal line 547-1 and the coupling source of the signal line 546-1 is switched to the signal line 548-1.

(P30) The CPU 535 compares the identification information of the fan 521-1 read from the storage unit 524-1 in the procedure (P27) with the identification information of the fan 521-1 previously read, which is stored in the storage unit 538.

In this case, since the identification information of the fan 521-1 read in the procedure (P27) is different from the identification information of the fan 521-1 previously read, the CPU 535 determines that the fan unit 514-1 has been replaced. By executing the test program, the CPU 535 performs a fan test of the fan 521-1 and setting of the fan 521-1.

For example, the CPU 535 executes the same processing as (B1) and (B2) described above in the fan test of the fan 521-1, and executes the same processing as (C1) and (C2) described above in the setting of the fan 521-1.

(P31) After that, the CPU 535 monitors temperatures of the CPU 511-$j$, the memory 512-$k$, and the auxiliary storage device 513, and controls the fan 521-$i$.

Figure 9:
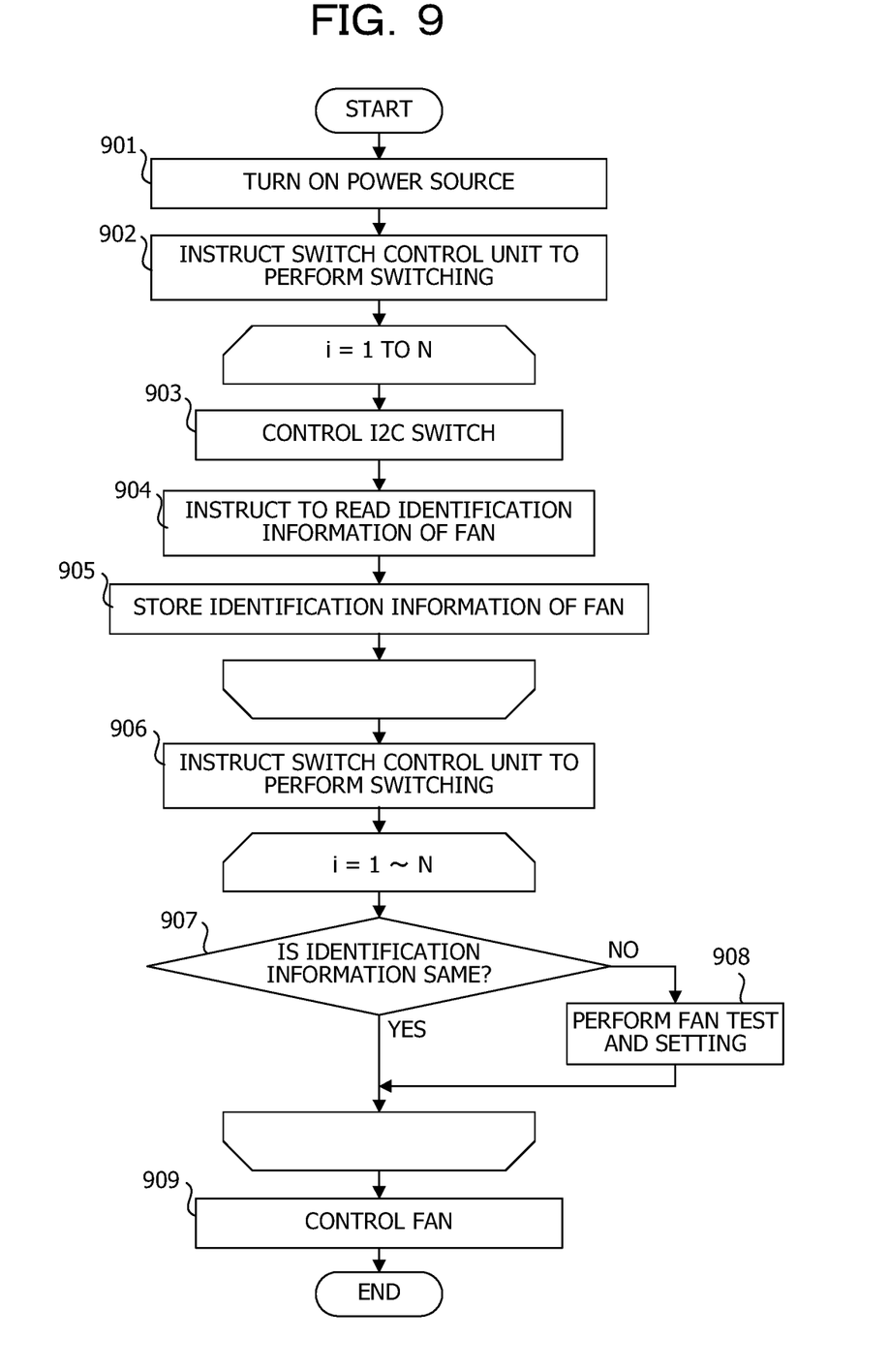
FIG. 9 is a flowchart of first control processing.

FIG. 9 is a flowchart illustrating an example of first control processing performed by the BMC 518 in the operation sequence illustrated in FIG. 7. The CPU 535 of the BMC 518 performs the control processing illustrated in FIG. 9 by executing the firmware.

First, the CPU 535 instructs the power source 517 to start supply of power by turning on the power source 517 (step 901). Accordingly, the switch control unit 523-$i$ of each fan unit 514-$i$ controls the switch 522-$i$ such that the coupling destination of the signal line 545-$i$ is switched to the signal line 543-$i$ and the coupling destination of the signal line 546-$i$ is switched to the signal line 544-$i$. The timer 527-$i$ starts counting for a predetermined time.

Next, the CPU 535 instructs each switch control unit 533-$i$ to switch the coupling sources of the signal line 545-$i$ and the signal line 546-$i$ (step 902). According to the instruction from CPU 535, each switch control unit 533-$i$ controls the switch 515-$i$ such that the coupling source of the signal line 545-$i$ is switched to the signal line 549-$i$ and the coupling source of the signal line 546-$i$ is switched to the signal line 550-$i$.

Next, the CPU 535 repeats processing of step 903 to step 905 for i=1 to N.

First, the CPU 535 instructs the I2C control unit 534 to switch the coupling destination of the signal line 551 to the signal line 549-$i$ and switch the coupling destination of the signal line 552 to the signal line 550-$i$ (step 903). The I2C control unit 534 controls the I2C switch 516 such that the coupling destination of the signal line 551 is switched to the signal line 549-$i$ and the coupling destination of the signal line 552 is switched to the signal line 550-$i$.

Next, the CPU 535 instructs the I2C control unit 534 to read identification information of the fan 521-$i$ (step 904). According to the instruction from CPU 535, the I2C control unit 534 reads the identification information of the fan 521-$i$ from the storage unit 524-$i$ of the fan unit 514-$i$, and outputs the read identification information to the CPU 535.

Next, the CPU 535 stores the identification information of the fan 521-$i$ in the storage unit 538 (step 905).

When the processing of step 903 to step 905 for i=1 to N is ended, the CPU 535 activates the timer 537, and the timer 537 starts counting for a predetermined time.

When the timer 527-$i$ of each fan unit 514-$i$ ends counting for the predetermined time, each switch control unit 523-$i$ changes the coupling destinations of the signal line 545-$i$ and the signal line 546-$i$. At this time, each switch control unit 523-$i$ controls the switch 522-$i$ such that the coupling destination of the signal line 545-$i$ is switched to the signal line 541-$i$ and the coupling destination of the signal line 546-$i$ is switched to the signal line 542-$i$.

When the timer 537 ends counting for the predetermined time, the CPU 535 instructs each switch control unit 533-$i$ to switch the coupling sources of the signal line 545-$i$ and the signal line 546-$i$ (step 906). According to the instruction from the CPU 535, each switch control unit 533-$i$ controls the switch 515-$i$ such that the coupling source of the signal line 545-$i$ is switched to the signal line 547-$i$ and the coupling source of the signal line 546-$i$ is switched to the signal line 548-$i$.

Next, the CPU 535 repeats processing of step 907 for i=1 to N. In step 907, the CPU 535 compares the identification information of the fan 521-$i$ read from each storage unit 524-$i$ in step 904 with the identification information of the fan 521-$i$ previously read, which is stored in the storage unit 538.

When the identification information of the fan 521-$i$ read in step 904 is the same as the identification information of the fan 521-$i$ previously read (step 907, YES), the CPU 535 increments i by 1 and repeats the processing of step 907.

When the identification information of the fan 521-$i$ read in step 904 is different from the identification information of the fan 521-$i$ previously read (step 907, NO), the CPU 535 performs the fan test and the setting of the fan 521-$i$ (step 908). The CPU 535 increments i by 1 and repeats the processing in step 907.

For example, the CPU 535 executes the same processing as (B1) and (B2) described above in the fan test of the fan 521-$i$, and executes the same processing as (C1) and (C2) described above in the setting of the fan 521-$i$.

When the processing of step 907 is ended for i=1 to N, the CPU 535 monitors the temperatures of the CPU 511-$j$, the memory 512-$k$, and the auxiliary storage device 513, and controls the fan 521-$i$ (step 909).

In step 908, the CPU 535 may perform either the fan test or setting of the fan 521-$i$.

Figure 10:
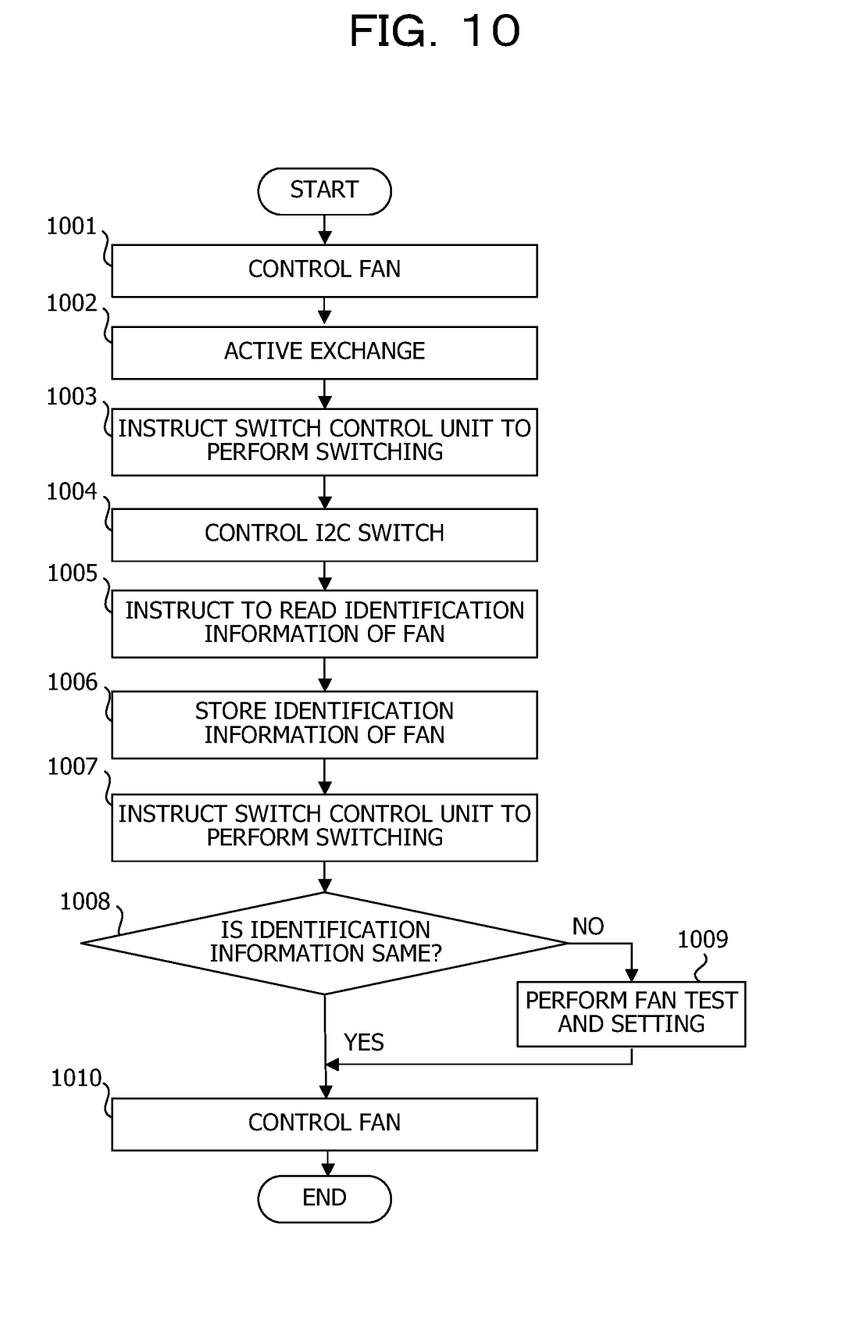
FIG. 10 is a flowchart of second control processing.

FIG. 10 is a flowchart illustrating an example of second control processing performed by the BMC 518 in a case where active exchange of a fan unit 514-$x$ ($x$=1 to N) is performed during the operation of the server 501. The CPU 535 of the BMC 518 executes the firmware to perform the control processing in FIG. 10.

First, the CPU 535 monitors the temperatures of the CPU 511-$j$, the memory 512-$k$, and the auxiliary storage device 513, and controls the fan 521-$i$(step 1001).

Next, the operator of the maintenance and replacement work performs active exchange in which the fan unit 514-$x$ is replaced with a new fan unit 514-$x$ (step 1002).

After that, the CPU 535 receives, from a reading unit 532-$x$, a notification indicating that the pulse signal from an output unit 526-$x$ has been interrupted, and instructs a switch control unit 533-$x$ to switch coupling sources of a signal line 545-$x$ and a signal line 546-$x$ (step 1003). According to the instruction from the CPU 535, the switch control unit 533-$x$ controls a switch 515-$x$ such that a coupling source of the signal line 545-$x$ is switched to a signal line 549-$x$ and a coupling source of the signal line 546-$x$ is switched to a signal line 550-$x$.

When a new fan unit 514-$x$ is mounted in the server 501, the power source 517 supplies power to the fan unit 514-$x$. Accordingly, a switch control unit 523-$x$ controls a switch 522-$x$ such that a coupling destination of the signal line 545-$x$ is switched to a signal line 543-$x$ and a coupling destination of the signal line 546-$x$ is switched to a signal line 544-$x$. A timer 527-$x$ starts counting for a predetermined time.

Next, the CPU 535 instructs the I2C control unit 534 such that the coupling destination of the signal line 551 is switched to the signal line 549-$x$ and the coupling destination of the signal line 552 is switched to the signal line 550-$x$ (step 1004). The I2C control unit 534 controls the I2C switch 516 such that the coupling destination of the signal line 551 is switched to the signal line 549-$x$ and the coupling destination of the signal line 552 is switched to the signal line 550-$x$.

Next, the CPU 535 instructs the I2C control unit 534 to read identification information of a fan 521-$x$ (step 1005). According to the instruction from CPU 535, the I2C control unit 534 reads the identification information of the fan 521-$x$ from a storage unit 524-$x$ of the fan unit 514-$x$, and outputs the read identification information to the CPU 535.

Next, the CPU 535 stores the identification information of the fan 521-$x$ in the storage unit 538 (step 1006). The CPU 535 activates the timer 537, and the timer 537 starts counting for a predetermined time.

When the timer 527-$x$ of the fan unit 514-$x$ ends counting for the predetermined time, the switch control unit 523-$x$ changes the coupling destinations of the signal line 545-$x$ and the signal line 546-$x$. At this time, the switch control unit 523-$x$ controls the switch 522-$x$ such that the coupling destination of the signal line 545-$x$ is switched to the signal line 541-$x$ and the coupling destination of the signal line 546-$x$ is switched to the signal line 542-$x$.

When the timer 537 ends counting for the predetermined time, the CPU 535 instructs the switch control unit 533-$x$ to switch the coupling sources of the signal line 545-$x$ and the signal line 546-$x$ (step 1007). According to the instruction from the CPU 535, the switch control unit 533-$x$ controls the switch 515-$x$ such that the coupling source of the signal line 545-$x$ is switched to a signal line 547-$x$ and the coupling source of the signal line 546-$x$ is switched to a signal line 548-$x$.

Next, the CPU 535 compares the identification information of the fan 521-$x$ read from the storage unit 524-$x$ in step 1005 with the identification information of the fan 521-$x$ previously read, which is stored in the storage unit 538 (step 1008).

When the identification information of the fan 521-$x$ read in step 1005 is the same as the identification information of the fan 521-$x$ previously read (step 1008, YES), the CPU 535 performs processing of step 1010. In step 1010, the CPU 535 monitors the temperatures of the CPU 511-$j$, the memory 512-$k$, and the auxiliary storage device 513, and controls the fan 521-$i$.

When the identification information of the fan 521-$x$ read in step 1005 is different from the identification information of the fan 521-$x$ previously read (step 1008, NO), the CPU 535 performs a fan test and setting of the fan 521-$x$ (step 1009). The CPU 535 performs the processing in step 1010.

For example, the CPU 535 executes the same processing as (B1) and (B2) described above in the fan test of the fan 521-$x$, and executes the same processing as (C1) and (C2) described above in the setting of the fan 521-$x$.

In step 1009, the CPU 535 may perform either the fan test or the setting of the fan 521-$x$.

The configuration of the information processing apparatus 301 in FIG. 3 is merely an example, and a part of the constituent elements may be omitted or changed depending on the application or conditions of the information processing apparatus 301. The configurations of the server 101 in FIG. 1 and the server 501 in FIGS. 5 and 6 are merely examples, and a part of the constituent elements may be omitted or changed depending on the application or conditions of the server. For example, in the server 501, another control unit may control the fan 521-$i$ instead of the BMC 518.

The operation sequences of FIGS. 7 and 8 are merely examples, and a part of procedures may be omitted or changed depending on the configuration or conditions of the server 501. The flowcharts of FIGS. 4, 9, and 10 are merely examples and a part of processing may be omitted or changed depending on the configuration or conditions of the information processing apparatus 301 or the server 501.

The error threshold and the warning threshold in FIGS. 2A and 2B are merely examples, and the error threshold and the warning threshold change depending on the fan or the conditions.

Although the disclosed embodiment and its advantages have been described in detail, those skilled in the art could make various modifications, additions, and omissions without deviating from the scope of the present disclosure clearly recited in claims.

With regard to the embodiment described with reference to FIGS. 1 to 10, the following appendices are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a heat generator;
a fan configured to cool the heat generator;
a storage configured to store identification information of the fan;
a coupling destination switch configured to switch a coupling destination of a signal cable to either the fan or the storage; and
a fan controller configured to control the fan via the signal cable in a state where the coupling destination is switched to the fan by the coupling destination switch, and read the identification information from the storage via the signal cable in a state where the coupling destination is switched to the storage by the coupling destination switch, wherein
the fan controller holds identification information previously read via the signal cable before reading the identification information from the storage, and the fan controller executes at least one of a test of the fan and setting of the fan when the identification information read from the storage is different from the identification information previously read.

2. The information processing apparatus according to claim 1,
wherein the fan controller reads a rotational speed of the fan via the signal cable in a state where the coupling destination is switched to the fan by the coupling destination switch.

3. The information processing apparatus according to claim 2,
wherein the fan controller includes
an output circuit configured to output a control signal for controlling the fan,
a first reading circuit configured to read the rotational speed of the fan, and
a second reading circuit configured to read the identification information,
the information processing apparatus further comprises a coupling source switch configured to switch a coupling source of the signal cable to either a combination of the output circuit and the first reading circuit or a bus that reads the identification information,
the output circuit outputs the control signal to the fan via the signal cable in a state where the coupling destination is switched to the fan by the coupling destination switch and the coupling source is switched to the combination of the output circuit and the first reading circuit by the coupling source switch,
the first reading circuit reads the rotational speed via the signal cable in a state where the coupling destination is switched to the fan by the coupling destination switch and the coupling source is switched to the combination of the output circuit and the first reading circuit by the coupling source switch, and
the second reading circuit reads the identification information from the storage via the signal cable and the bus in a state where the coupling destination is switched to the storage by the coupling destination switch and the coupling source is switched to the bus by the coupling source switch.

4. The information processing apparatus according to claim 3, further comprising:
a power source configured to supply power to the fan; and
a coupling destination switch controller configured to control the coupling destination switch such that the coupling destination is switched to the storage when the supply of the power from the power source to the fan is started, and control the coupling destination switch such that the coupling destination is switched to the fan after a predetermined time elapses after the supply of the power is started,
wherein the fan controller instructs the power source to start supplying the power, and when the supply of the power is started, controls the coupling source switch such that the coupling source is switched to the bus, and controls the coupling source switch such that the coupling source is switched to the combination of the output circuit and the first reading circuit after the predetermined time elapses after the identification information is read from the storage.

5. A control method for causing a processor to execute a process, the process comprising:
reading identification information from a storage via a signal cable in a state where a coupling destination is switched to the storage by a coupling destination switch that switches the coupling destination of the signal cable to either a fan that cools a heat generator or the storage that stores the identification information of the fan;
controlling the fan via the signal cable in a state where the coupling destination is switched to the fan by the coupling destination switch; and
executing at least one of a test of the fan or setting of the fan in a case where the identification information read from the storage is different from identification information previously read via the signal cable before reading the identification information from the storage.

6. The control method according to claim 5,
wherein the controlling the fan includes reading a rotational speed of the fan via the signal cable in a state where the coupling destination is switched to the fan by the coupling destination switch.

7. The control method according to claim 6,
wherein the reading the identification information includes reading the identification information from the storage via the signal cable and a bus that reads the identification information, in a state where the coupling destination is switched to the storage by the coupling destination switch, and a coupling source of the signal cable is switched to the bus by a coupling source switch that switches the coupling source to either a combination of an output circuit that outputs a control signal for controlling the fan and a reading circuit that reads the rotational speed of the fan or the bus,
the controlling the fan further includes outputting the control signal to the fan via the signal cable in a state where the coupling destination is switched to the fan by the coupling destination switch and the coupling source is switched to the combination of the output circuit and the reading circuit by the coupling source switch, and
the reading the rotational speed of the fan includes reading the rotational speed via the signal cable in a state where the coupling destination is switched to the fan by the coupling destination switch and the coupling source is switched to the combination of the output circuit and the reading circuit by the coupling source switch.

8. The control method according to claim 7, for causing the processor to execute the process, the process further comprising:

instructing a power source that supplies power to the fan to start supply of the power;

controlling the coupling source switch to switch the coupling source to the bus when the supply of the power from the power source to the fan is started; and controlling the coupling source switch to switch the coupling source to the combination of the output circuit and the reading circuit after a predetermined time elapses after the identification information is read from the storage, wherein the coupling destination switch switches the coupling destination to the storage when the supply of the power is started, and switches the coupling destination to the fan after the predetermined time elapses after the supply of the power is started.

* * * * *